United States Patent
Speno et al.

(10) Patent No.: US 8,214,294 B2
(45) Date of Patent: Jul. 3, 2012

(54) METHOD AND SYSTEM FOR DETECTION OF COUNTERFEIT GOODS USING MODIFIED STANDARD MARKING PROTOCOLS

(75) Inventors: Frank Gregory Speno, Glendale, MO (US); Michael Louis Griffin, Town and Country, MO (US)

(73) Assignee: The Boeing Company, Chicago, IL (US)

(*) Notice: Subject to any disclaimer, the term of this patent is extended or adjusted under 35 U.S.C. 154(b) by 278 days.

(21) Appl. No.: 12/251,322

(22) Filed: Oct. 14, 2008

(65) Prior Publication Data

US 2010/0094830 A1 Apr. 15, 2010

(51) Int. Cl.
*G06F 17/30* (2006.01)

(52) U.S. Cl. .................. 705/50; 726/2; 705/58

(58) Field of Classification Search .............. 705/50, 705/58; 726/2
See application file for complete search history.

(56) References Cited

U.S. PATENT DOCUMENTS

| | | | | |
|---|---|---|---|---|
| 6,005,960 | A * | 12/1999 | Moore | 382/111 |
| 6,069,955 | A * | 5/2000 | Coppersmith et al. | 380/54 |
| 2006/0180661 | A1* | 8/2006 | Grant et al. | 235/382 |
| 2007/0179978 | A1* | 8/2007 | Lee et al. | 707/104.1 |
| 2007/0219916 | A1* | 9/2007 | Lucas | 705/58 |
| 2009/0313678 | A1* | 12/2009 | Guenter et al. | 726/2 |
| 2010/0017330 | A1* | 1/2010 | Tan | 705/50 |

* cited by examiner

*Primary Examiner* — Mahesh Dwivedi
(74) *Attorney, Agent, or Firm* — Caven & Aghevli LLC

(57) ABSTRACT

A system and method for coordinating identification of an object transported between a sender and a receiver includes the object. The object is one of a plurality of similar objects. An object identifier is associated with the object. The object identifier is an element in a non-repeating, non-linear series of object identifiers for the similar objects. A communication system is between the sender and the receiver for communicating at least a characteristic of the object identifier.

19 Claims, 4 Drawing Sheets

METHOD AND SYSTEM FOR DETECTION OF COUNTERFEIT GOODS USING MODIFIED STANDARD MARKING PROTOCOLS

FIELD

The present disclosure is generally related to a system and method for detecting counterfeit goods. The invention has particular utility in connection with authenticating genuine goods shipped between a sender and receiver and will be described in connection with such utility, although other utilities are contemplated.

BACKGROUND

In the manufacturing of various pieces of equipment, products and technology, it is common to have elements of items manufactured in remote or disparate locations and shipped for assembly to other locations, or as replacement parts for installation in the field. Being able to track shipped parts and authenticate the parts is paramount in a number of industries. A counterfeit and faulty part in an aircraft, for instance, may put many lives at risk. Product counterfeiters have become adept at mimicking shipping techniques and markings to avoid detection and overcome existing validation methods.

SUMMARY

Embodiments of the present disclosure provide a system and method of coordinating an object identification between a sender and a receiver. Briefly described, the present disclosure can be viewed as providing methods for coordinating identification of an object transported between a sender and a receiver. In this regard, one embodiment of such a method, among others, can be broadly summarized by the following steps: validating a sender; receiving object identification data; generating an object identifier, wherein the object identifier is an element in a non-repeating, non-linear series of object identifiers for similar objects; associating the object identifier with an object, wherein the object is one of a plurality of similar objects; storing the object identifier and the object identification data in a central database; communicating the object identifier between a sender and a central database; transporting the object with the object identifier from a sender to a receiver; and authenticating the object with the object identifier by communicating with the central database.

The present disclosure also can be viewed as a system which is implemented as follows. The system contains the object or part, which is one of a plurality of similar objects. An object identifier is associated with the object. The object identifier is an element in a non-repeating, non-linear series of object identifiers for similar objects. A communication system is between the sender, the receiver and a central database for communicating at least a characteristic of the object identifier.

Yet another embodiment of the present disclosure provides an article of manufacture comprising an information storage medium having computer readable program code disposed therein and executable by a processor to coordinate object identification between a sender and a receiver, by the steps of: generating an object identifier; associating the object identifier with an object, wherein the object is one of a plurality of similar objects; communicating the object identifier between the sender and the receiver; transporting the object with the object identifier from the sender to the receiver; and authenticating the object with the object identifier, wherein the object identifier is an element in a non-repeating, non-linear series of object identifiers for the similar objects.

The features, functions, and advantages that have been discussed can be achieved independently in various embodiments of the present disclosure or may be combined in yet other embodiments further details of which can be seen with reference to the following description and drawings.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION

Figure 1:
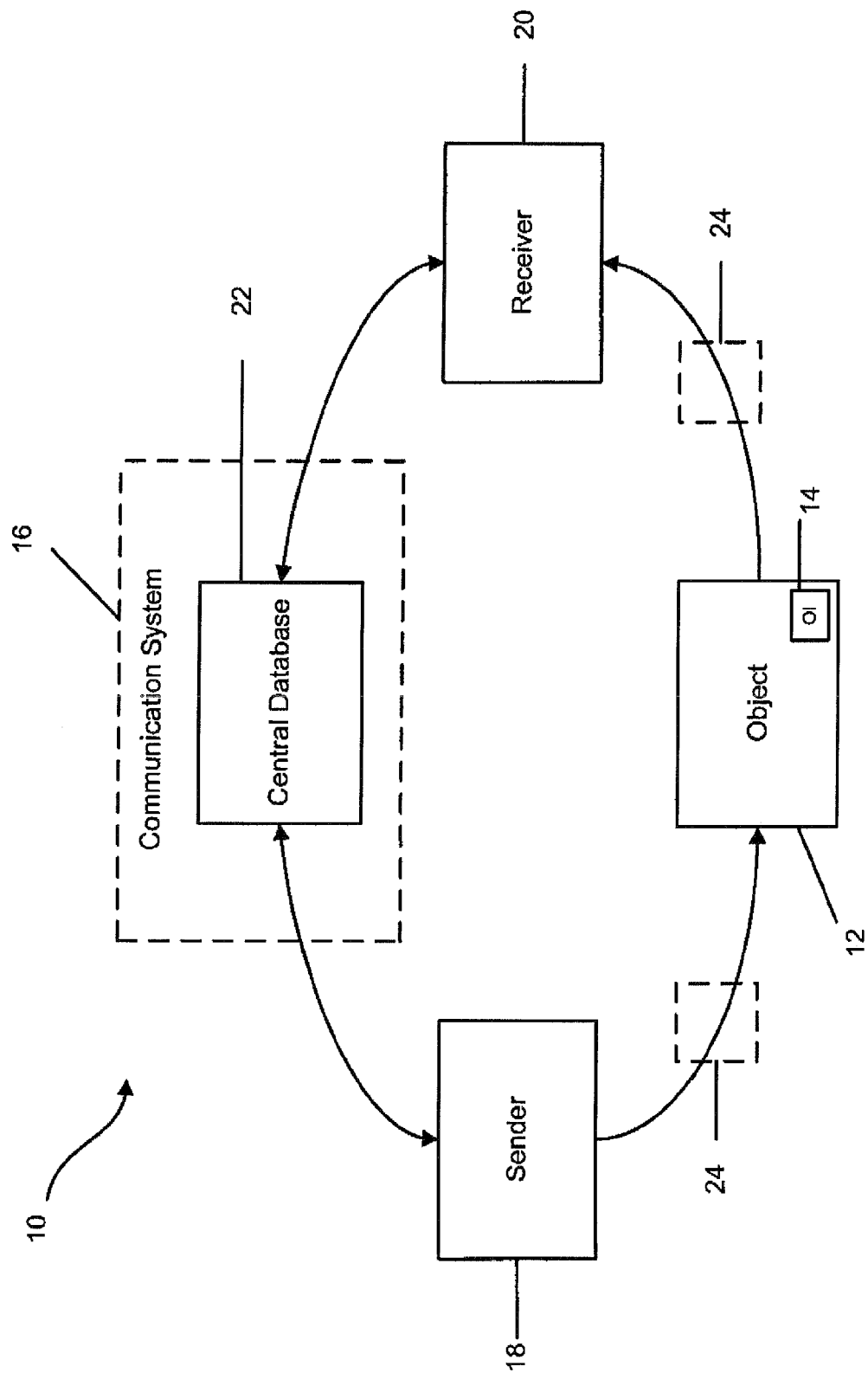
FIG. 1 is an illustration of a block diagram of a system for coordinating identification of objects, in accordance with a first exemplary embodiment of the disclosure.

FIG. 1 is an illustration of a block diagram of a system 10 for coordinating identification of an object 12 transported between a validated sender 18 and a validated receiver 20, in accordance with a first exemplary embodiment of the disclosure. The system 10 contains the object 12, which is one of a plurality of similar objects. An object identifier 14 is associated with the object 12. The object identifier 14 is an element in a non-repeating, non-linear series of object identifiers for the similar objects. A communication system 16 is between the sender 18 and the receiver 20 for communicating at least a characteristic of the object identifier 14.

The object 12 may be anything tangible that is transported, where determining the authenticity of the object 12 is desirable. For example, the object 12 may be an axle, wherein a single sender 18 may transport hundreds of axles to a single receiver 20. Maintaining authenticity of the object 12, the one axle, requires a relatively unique object identifier 14.

The object identifier 14 may be, for example, an alphanumeric code or a representation of the same. The object identifier 14 is non-repeating and non-sequential/non-linear. A repeating identification code that is read by a counterfeiter allows a counterfeiter to simply print the same identification code on its counterfeit product and enter it into the system. A sequential/linearly progressing identification code that is read by a counterfeiter allows a counterfeiter to simply print an identification code further along the sequence on its counterfeit product and enter it into the system. A non-repeating, non-linear identification code makes it difficult for a counterfeiter to predict an identification code that will enter the system.

The object identifier 14 may include a varying number of characters within the series of object identifiers 14. If desired, some object identifiers 14 in the series may be void, e.g. of numbers while other object identifiers 14 in the series may be void, e.g. of letters. The object identifier 14 may be generated by the central database 22 at the request of the sender 18 (the first of whom is generally the manufacturer of the part) and may be generated by an individual or automatically by a central database which may be programmed to avoid generating object identifiers 14 already in the series, such that a repeated object identifier 14 in the system 10 is an indicator of a counterfeit object identifier.

Once the object identifier 14 is created, a communication system 16 is provided to independently allow the sender 18 to record the object identifier 14 to the object 12 and for the receiver 20 to hold the object identifier 14 for authentication. The object identifier 14 is generated automatically by the central database 22 shared by the sender 18 and the receiver 20. The object identifier 14 may be transported in any manner known to those of ordinary skill in the art of data transmissions. The object identifier 14 may be sent, for example, by electronic mail, by telephone communication, or through other, preferably secure and/or encrypted, communications. All such codes and similar systems for communication of codes are contemplated by the present disclosure.

The sender 18 and recipient 20 may share access to a central database 22. The central database 22 may be secured for limiting access to specified validated users. The object identifier 14, once generated, may be stored in the central database 22. The central database 22 may be utilized for storage of other objects 12 specific data.

The sender 18 may associate the object identifier 14 with the object 12. Printing the object identifier 14 to a linear or two dimensional mark which may be applied directly to the object 12, e.g. by Dot Peen marking, laser marked or printing using, for example, ink jet printing, or printed on a label which is adhesively applied to object 12 joining the mark and the object 12 may create the association. The sender 18 may record the object identifier 14 on an RFID chip and place the RFID chip with the object 12 and/or the packaging for the object 12. The object identifier 14 may be stored in any medium that may be associated and transported with the object 12. The object identifier 14 may be joined with other data carried by the object 12. The object identifier 14 may be merged with other data fields on a standard Unique Identification (UID) or other identification system such as an ATA 2000 mark (airline industry specific identification system). The sender 18 may have the equipment to record the object identifier 14 on the medium associated with the object 12, although the sender 18 may simply receive a pre-recorded medium from the receiver 20 for associating with the object 12.

The receiver 20 may have equipment to read data, including the object identifier 14, from the medium associated with the object 12. The equipment may be a bar code reader, an RFID reader, or whatever reader is appropriate for the given medium. The reader may be in communication with the central database 22. The object identifier 14 read by the reader may be entered separately, and/or manually, into the central database 22. The object identifier 14 read by the reader may be compared to the object identifier 14 communicated between the sender 18 and the receiver 20 previously to authenticate the object 12. If the object identifier 14 was not previously communicated between the sender 18 and the receiver 20, the receiver 20 may investigate further to determine if there was a communication problem and/or to determine if the object 12 is authentic.

At intermediate locations 24 between the sender 18 and the receiver 20, the object identifier 14 may be read from the medium and communicated to the sender 18, receiver 20, and/or the central database 22. A time stamp and identification of the intermediate location may also be communicated with the object identifier 14. Collection of this data may be used to form a transport history that may be stored in the central database 22 or another database. If an object 12 received by the receiver 20 is found to be inauthentic, a transport history may be investigated to determine where and when the inauthentic good may have entered the transport system. If an object 12 is found to be inauthentic through the central database 22, a communication may be generated automatically alerting the sender 18 and/or the receiver 20 to the inauthentic good.

Figure 2:
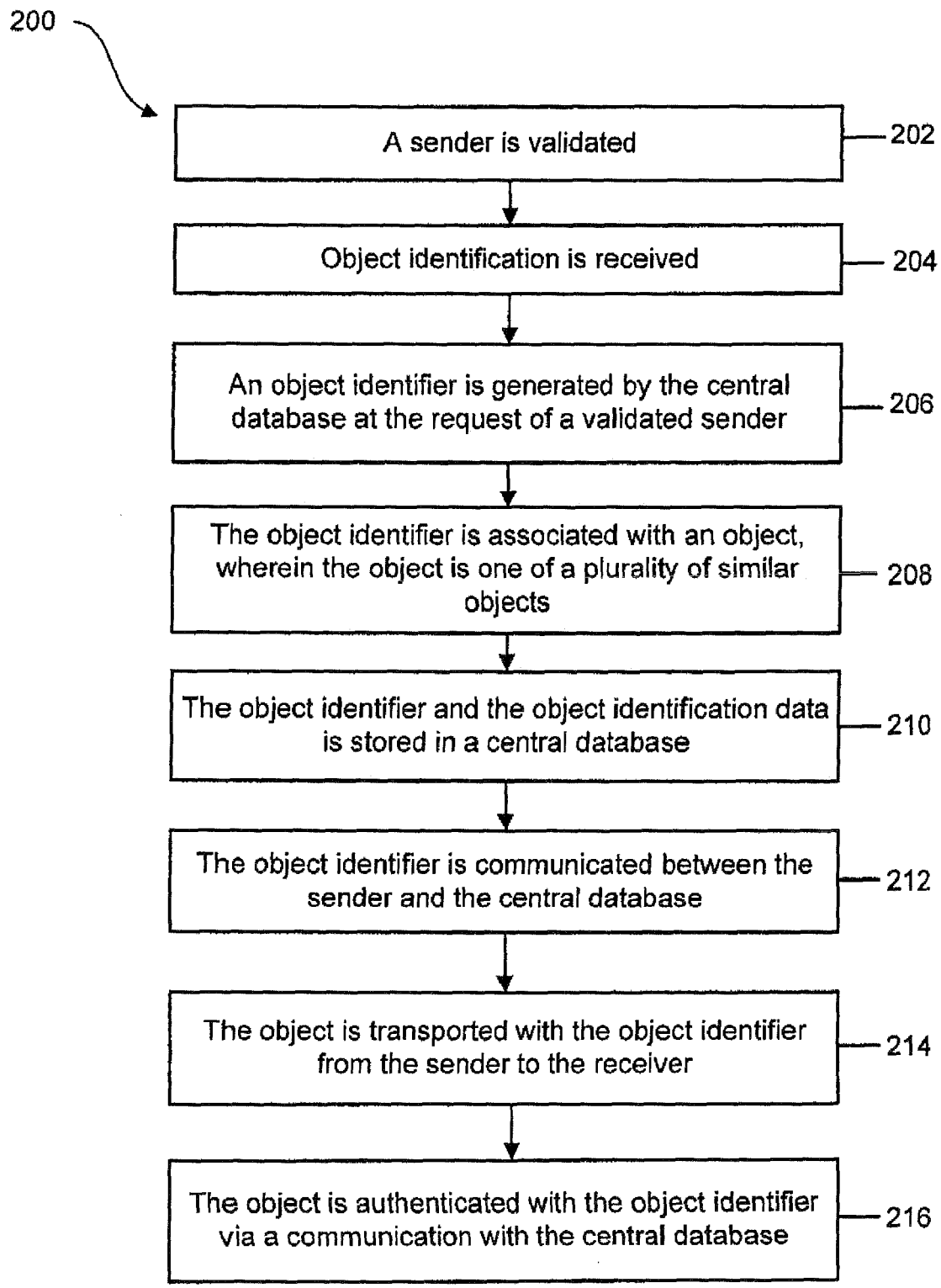
FIG. 2 is an illustration of a flowchart for a method for coordinating identification of objects utilizing the system shown in FIG. 1, in accordance with the first exemplary embodiment of the disclosure.

FIG. 2 is a flowchart 200 illustrating a method for coordinating identification utilizing the system 10 shown in FIG. 1, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, a sender 18 is validated. Object identification data is received (block 204). An object identifier 14 is generated by the central database 22 at the request of a validated sender 18 (block 206). In general, the first sender 18 of an object 12 would be the original equipment manufacturer. The object identifier 14 is associated with an object 12, wherein the object 12 is one of a plurality of similar objects 12 (block 208). The object identifier 14 and the object identification data are stored in a central database 22 (block 210). The object identifier 14 is communicated between the sender 18 and the central database 22 (block 212). The object 12 is transported with the object identifier 14 from the sender 18 to the receiver 20 (block 214). The object 12 is authenticated with the object identifier 14 via a communication with the central database 22 (block 216). The object identifier 14 is an element in a non-repeating, non-linear series of object identifiers 14 for the similar objects 12.

Figure 3:
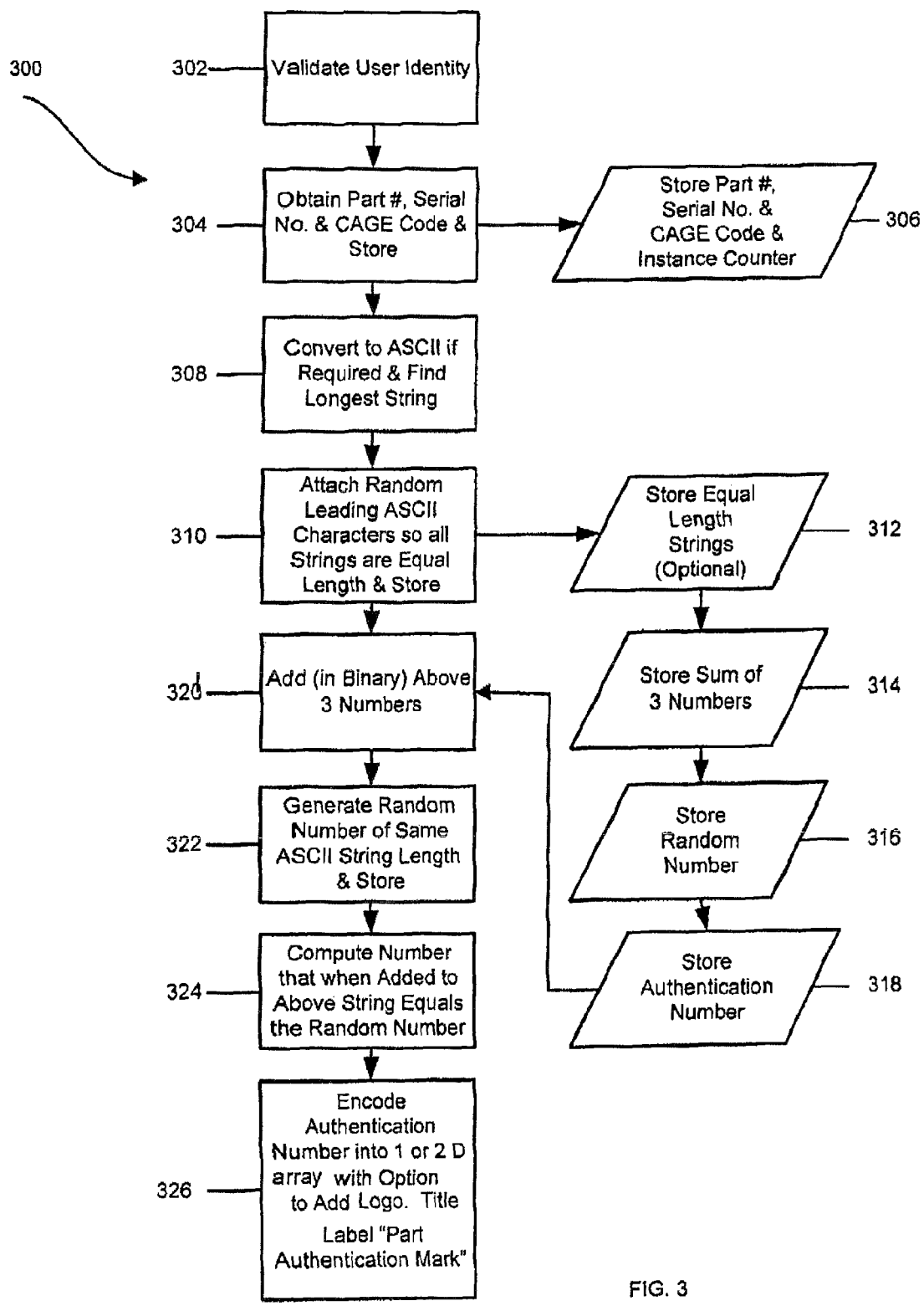
FIG. 3 is an illustration of a flowchart for a method for generating an object identifier, in accordance with a second exemplary embodiment of the disclosure.

FIG. 3 is an illustration of a flowchart 300 for a method for generating an object identifier 14, in accordance with a second exemplary embodiment of the disclosure. First a user of the system 10 is validated (block 302). Once the user is validated, the object 12 is identified (block 304). The identification of the object 12 is stored in a central database 22 (block 306). The identification of the object 12 is converted to ASCII (block 308). Random ASCII characters are attached to the identification of the object 12 such that all strings are equal in length (block 310). The strings are stored in the database (block 312). The three identification numbers are added in binary (block 320). The sum of the three identification numbers is stored in the database (block 314). A random number of the same length as the ASCII string is generated (322). The random number is stored in the central database 22 (block 316). A difference of the ASCII string and the random number is calculated to create an object identifier 14 (324).

The object identifier 14 is stored in the database (block 318). The object identifier 14 is encoded into a one or two dimensional array and generated into a label fixed to the object 12 (block 326). There are many other methods for generating an object identifier. FIG. 3 is one specific implementation. The important characteristic of the object identifier is that it is structured in a way that cannot be determined by a non-validated entity and is stored in the central database (318) in association with the data stored in (306).

Figure 4:
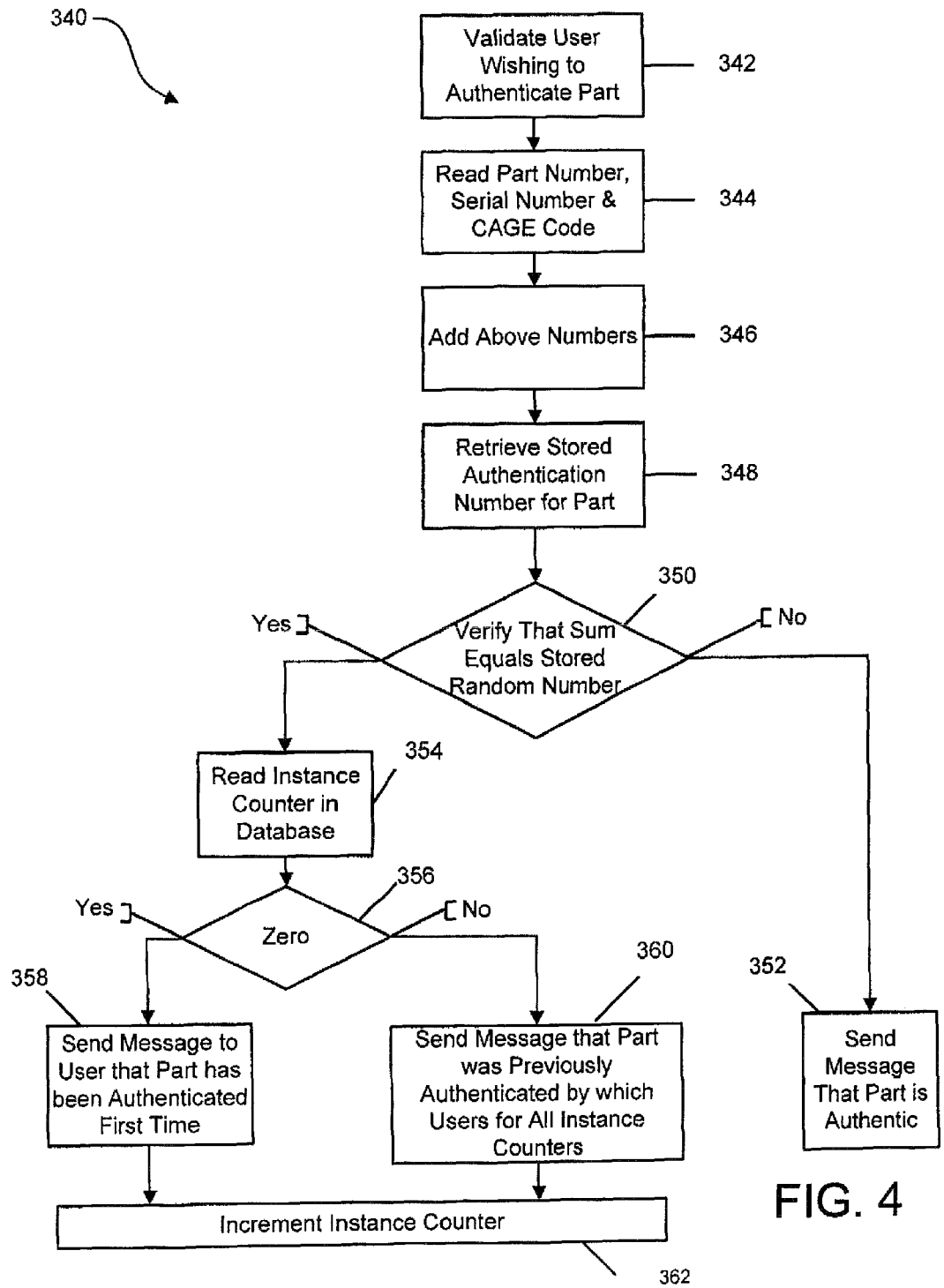
FIG. 4 is an illustration of a flowchart for a method for authenticating the object identifier generated according to the method shown in FIG. 3, in accordance with the second exemplary embodiment of the disclosure.

FIG. 4 is an illustration of a flowchart 340 for a method for authenticating the object identifier 14 generated according to the method shown in FIG. 3, in accordance with the second exemplary embodiment of the disclosure. First a user of the system 10 is validated (block 342). Once the user is validated, the object 12 is read for the three identification numbers (block 344). The three identification numbers are added (block 346). The object identifier 14 is retrieved (block 348). The system 10 verifies that a sum of the three identification numbers and the object identifier 14 is the previously randomly generated number (block 350). If it is not, the object 12 is identified as inauthentic (block 352). If it is, receipt of the object 12 is read into the central database 22 (block 354). The central database 22 checks whether this is the first receipt of the object 12 (block 356). If so, a message that the authenticated object 12 has entered the supply chain for the first time can be sent to authorized users as desired (block 358). If not, the object 12 is flagged as having moved to a new location in the supply chain and such information can be sent to validated users as desired 360. In either case, an increment instance counter is advanced to reflect the number of receipts of the object 12 having the object identifier 14 (block 362).

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of the present disclosure and protected by the following claims.

What is claimed is:

1. A method of coordinating object identification between a sender and a receiver, said method comprising the steps of:
   validating a sender;
   receiving a plurality of identification codes for an object;
   generating an object identifier based on said plurality of object identification codes by performing operations comprising:
      obtaining, from a central database, a part number, a serial number, and an identification code associated with the object;
      computing a sum of the a part number, serial number, and identification code; and
      generating a random number; and
      subtracting the sum of the respective ASCII strings from the random number to obtain the object identifier;
   associating the object identifier with an object, wherein the object is one of a plurality of similar objects;
   storing the object identifier and the object identification codes in a central database;
   communicating the object identifier between a sender and the central database;
   transporting the object with the object identifier from the sender to a receiver; and
   authenticating the object with the object identifier by communicating with the central database, by performing operations comprising:
      reading, from the object, a part number, a serial number, and an identification code associated with the object;
      retrieving, from the central database, the object identifier associated with the object; and
      verifying that the sum of the a sum of the a part number, serial number, and identification code corresponds to the random number.

2. The method of claim 1, wherein the step of communicating further comprises sending the object identifier in an encrypted message between a sender or a receiver and the central database.

3. The method of claim 1, wherein the step of communicating further comprises storing the object identifier in a central database accessible by both the sender and the receiver.

4. The method of claim 1, wherein elements in the non-repeating, non-linear series of object identifiers vary in character length.

5. The method of claim 1, wherein the step of generating the object identifier further comprises randomly generating the object identifier.

6. The method of claim 1, further comprising:
   recording the object identifier on a bar code or two dimensional array; and
   fixing the bar code or two dimensional array to the object.

7. The method of claim 1, further comprising:
   recording the object identifier in an RFID tag; and
   associating the RFID tag to the object.

8. The method of claim 1, further comprising:
   reading the object identifier at an intermediary position during transport; and
   reporting the reading from the intermediary position to the central database.

9. The method of claim 1, wherein the step of authenticating the object with the object identifier by communicating with the central database further comprises the steps of:
   comparing the object identifier with a plurality of stored object identifiers stored within the central database;
   identifying a matching object identifier within the plurality of stored object identifiers; and
   indicating that one of the object identifier and the matching object identifier is counterfeit.

10. A system for coordinating identification of an object transported between a sender and a receiver, the system comprising:
   an object identifier associated with the object; and
   a communication system between the sender, the receiver, and a central database for communicating at least a characteristic of the object identifier, wherein the central database is configured to:
   validate a sender;
   receive a plurality of object identification codes for an object;
   generate the object identifier based on said plurality of object identification codes by performing operations comprising:
      obtaining, from a central database, a part number, a serial number, and an identification code associated with the object;
      computing a sum of the a part number, serial number, and identification code; and
      generating a random number; and
      subtracting the sum of the respective ASCII strings from the random number to obtain the object identifier;

associate the object identifier with the object;

store the object identifier and the object identification codes in a central database;

communicate the object identifier between a sender and central database; and authenticate the object with the object identifier by communicating with the central database by performing operations comprising:

reading, from the object, a part number, a serial number, and an identification code associated with the object;

retrieving, from the central database, the object identifier associated with the object;

verifying that the sum of the a sum of the a part number, serial number, and identification code corresponds to the random number.

11. The system of claim 10, further comprising a medium for recording the object identifier, wherein the medium is attached to the object.

12. The system of claim 11, further comprising:
at least one recorder associated with the sender for recording the object identifier on the medium; and
a reader associated with the receiver for reading the object identifier on the medium.

13. The system of claim 10, further comprising an object identifier generator for automatically generating the object identifier.

14. The system of claim 13, wherein the object identifier generator further comprises a random number generator.

15. The system of claim 10, wherein the communication system further comprises a central database, wherein the sender and the receiver have writing and reading access to the central database to record the object identifier and to compare the object identifier recorded on the central database to the object identifier on the object to authenticate the object.

16. The system of claim 10, further comprising an alert system in communication with the receiver to alert the receiver to a counterfeit object identification, whereby a simultaneous instances of an object identifier is a counterfeit object identification.

17. An article of manufacture comprising a processor in communication with an information storage medium having computer readable program code disposed therein and executable by the processor to coordinate object identification between a sender and a receiver, by the steps of:

validating a sender;

receiving a plurality of identification codes for an object;

generating an object identifier based on said plurality of object identification codes by performing operations comprising:

obtaining, from a central database, a part number, a serial number, and an identification code associated with the object;

computing a sum of the a part number, serial number, and identification code; and generating a random number; and subtracting the sum of the respective ASCII strings from the random number to obtain the object identifier;

associating the object identifier with an object, wherein the object is one of a plurality of similar objects;

storing the object identifier and the object identifier data in a central database;

communicating the object identifier between a sender and central database;

transporting the object with the object identifier from the sender to the receiver; and authenticating the object with the object identifier, by communicating with the central database by performing operations comprising:

reading, from the object, a part number, a serial number, and an identification code associated with the object;

retrieving, from the central database, the object identifier associated with the object;

verifying that the sum of the a sum of the a part number, serial number, and identification code corresponds to the random number.

18. The article of manufacture of claim 17, wherein the step of communicating further comprises sending the object identifier in an encrypted message between the sender and the receiver.

19. The article of manufacture of claim 17, wherein the step of communicating further comprises one of the sender and the receiver storing the object identifier in a database accessible by both the sender and the receiver.

* * * * *